Feb. 22, 1927.
J. J. WILLIAMS
DUMB BELL BOLT
Filed Oct. 16, 1922
1,618,619
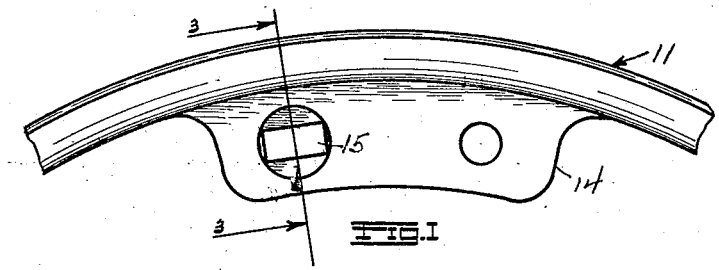
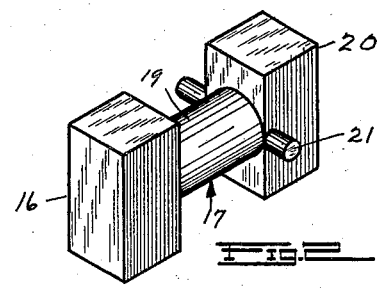
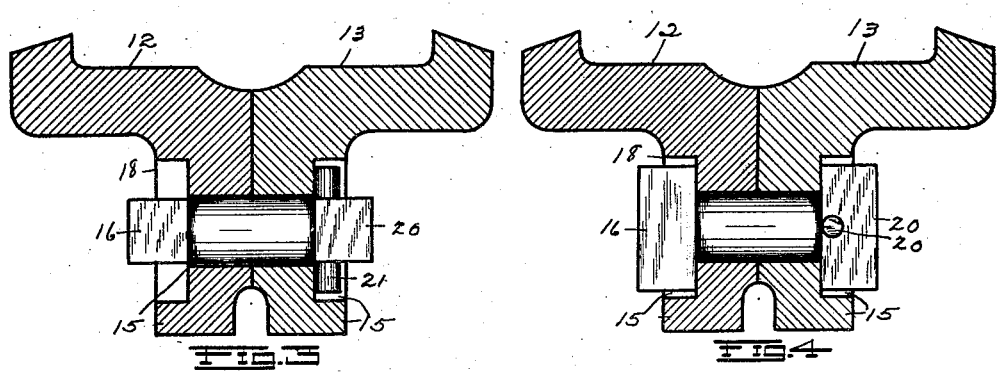
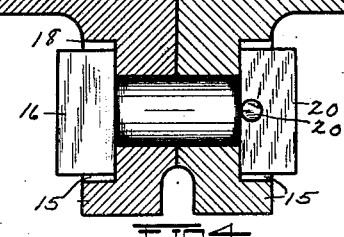
Job. J. Williams
Inventor Patented Feb. 22, 1927.

1,618,619

UNITED STATES PATENT OFFICE.

JOB J. WILLIAMS, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

DUMB-BELL BOLT.

Application filed October 16, 1922. Serial No. 594,854.

In curing a tire on an air bag it is customary to mount the carcass on the bead rings after the air bag has been inserted and before molding. These rings are formed in halves having flanges extending from their inner peripheries and provided with apertures blank in one half and screw-threaded in the other half. The two halves are applied to the two sides of the carcass and pressed together with hydraulic pressure and while under this pressure bolts are dropped through the non-threaded apertures and screwed into the threaded apertures. Fastening these rings together with screw-threaded bolts requires considerable time and I have constructed a new and improved bolt to eliminate this delay. These bolts are simple in construction and require no skill and very little time to manipulate and are not likely to become accidentally disengaged as the heads do not project beyond the outside of the bead rings and are covered by the inner portion of the molds used to vulcanize the tires.

In the drawings accompanying this specification and forming a part thereof I have shown, for purpose of illustration, one form which my invention may assume. In these drawings:—

Figure 1 is a partial side view of a bead ring showing this illustrative embodiment, Figure 2 is a perspective view of the bolt, Figure 3 is a cross-sectional view, taken on the line 3—3 of Figure 1, showing the bolt after it has been inserted into the aperture, while Figure 4 shows the bolt in locked position holding the rings firmly together.

In the drawings I have shown a bead ring 11 composed of parts 12 and 13 each having a plurality of inwardly projecting flanges 14 provided with apertures 15 of the size and shape to facilitate the insertion and removal of the head 16 of the bolt 17. The outer surfaces 18 of the apertures 15 are counter-bored to permit the bolt 17 to be rotated after it has been inserted into the aperture. The diameter of the shank 19 is substantially the same as the width of the bolt heads 16 and 20 one of which is provided with a pin 21 to prevent the bolt 17 from slipping farther into the aperture than is desired.

In operation the bead rings are assembled in the usual way and while under hydraulic pressure the bolt 17 is dropped into the rectangular aperture 15 and rotated so that the heads 16 and 20 overlie the flanges of the rings.

I have disclosed a specific embodiment of my invention but this disclosure is illustrative only and my invention is not limited thereto.

I claim:

A mold clamp comprising a shank, a rectangular head mounted on each end of the shank, and a pin lying at right angles to the length of said head to prevent undue insertion of the clamp.

In testimony whereof I have signed my name to the above specification.

JOB J. WILLIAMS.